Oct. 1, 1957　　　A. C. THOMAS　　　2,807,888
PLUMB INDICATING DEVICE
Filed May 28, 1956　　　　　　　　　2 Sheets-Sheet 1

INVENTOR.
ANDREW C. THOMAS
BY Elliott & Pastoriza
ATTORNEYS

Oct. 1, 1957  A. C. THOMAS  2,807,888
PLUMB INDICATING DEVICE
Filed May 28, 1956  2 Sheets-Sheet 2

INVENTOR.
ANDREW C. THOMAS
BY Elliott & Pastoriza
ATTORNEYS

United States Patent Office 2,807,888
Patented Oct. 1, 1957

2,807,888

PLUMB INDICATING DEVICE

Andrew C. Thomas, Venice, Calif.

Application May 28, 1956, Serial No. 587,523

3 Claims. (Cl. 33—208)

This invention relates generally to carpenters' tools, and more particularly to an improved plumb indicating device for facilitating plumbing of vertical surfaces such as walls, door frames, and the like.

Vertical aligning and positioning is ordinarily accomplished by the conventional plumb bob and line. The use of a simple plumb bob is advantageous in that it is compact, extremely accurate, and may be used to plumb large vertical distances. However, plumb devices of this type take time to set up and operate inasmuch as the plumb must assume a motionless position before an accurate sighting can be made. In the event gusty winds are present, the plumb bob must also be sheltered to enable it to assume such a rest position. Further, the apparatus is limited somewhat to use in ascertaining the vertical alignment of smooth walls or surfaces, since the line must depend in a rectilinear vertical direction. In other words, should the wall or surface be uneven at intermediate points or have projections such as pipes, the plumb line must be positioned away therefrom in order to hang in a vertical position. In such instances, the plumbing of the wall surface is a matter of guesswork unless the operator goes to the trouble of actually making perpendicular measurements between the line and the wall surface at the upper and lower ends of the line.

Bearing the above in mind, it is a primary object of the present invention to provide an improved plumb indicating device which constitutes a rigid structure when in an operative position so that it is not affected by wind nor is there any waiting time necessary before measurements can be taken; and yet which is so constructed that it may be folded away into a compact position for ready storage.

Another object is to provide a device of the above type which includes lateral projections at each of its far ends for engaging a wall or surface whereby plumbing of the surface may be effected notwithstanding intermediate projections or crookedness in the surface.

Still another important object is to provide a plumb indicating device in which the distance between the lateral projections at the far ends of the device may be adjusted so that differently spaced points on a wall or door frame may be accommodated by the device.

Other more general objects of this invention are to provide a plumb indicating device meeting the above objects which may also serve as a straight edge and which is susceptible to additional extension members for increasing its usefulness in plumbing large vertical distances.

These and other objects and advantages of this invention are attained by providing first and second elongated members hinged together in end to end relationship. The arrangement is such that when the hinged members are in an unfolded position, they are in exact alignment and when in a folded position they are in face to face engagement thus reducing the overall operative length of the members for convenient storage. Each of the members includes a lateral projecting means at its far end adapted to engage vertically spaced points on a surface to be plumbed. Conventional type leveling indicators, such as fluid bubbles, are transversely positioned on the members for indicating the vertical.

One of the members is designed such that its associated lateral projecting means is arranged to telescope out of the member whereby the distance between the projecting ends may be varied. The design is also such that, if desired, a further extension member may be inserted to enable even greater vertical distances to be plumbed. The lateral projecting means are preferably removable to facilitate storage.

A better understanding of this invention as well as further features and advantages thereof will be had by referring to the accompanying drawings, in which.

Figure 1:
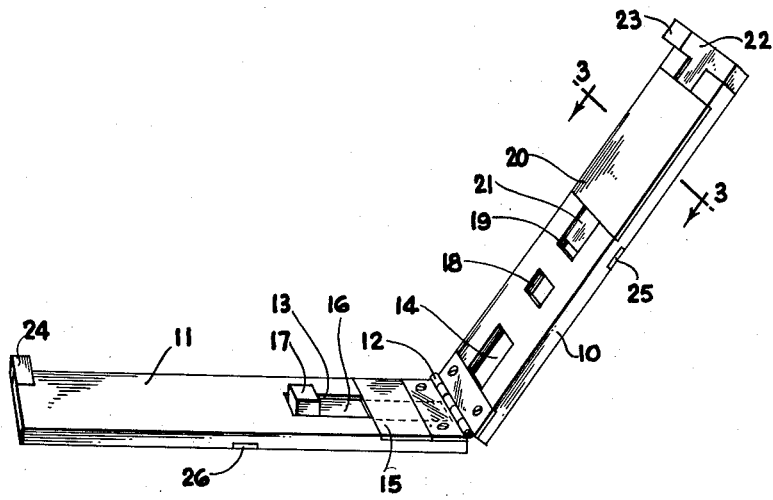
Figure 1 is a diagrammatic, perspective view illustrating the plumb indicating device of the present invention in partially folded position.
Figure 2:
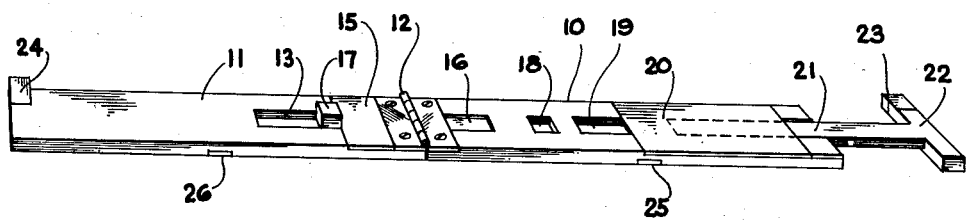
Figure 2 is another perspective view illustrating the device of Figure 1 in completely unfolded operative position.
Figure 3:
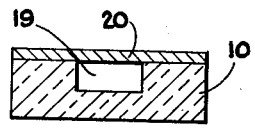
Figure 3 is an enlarged cross section taken in the direction of the arrows 3—3 of Figure 1.

Referring to Figures 1, 2 and 3, the plumb indicating device is shown as comprising first and second elongated members 10 and 11. These members preferably comprise elongated pieces of wood or boards having straight edges and uniform dimensions throughout their length. As shown, the adjacent ends of the members 10 and 11 are hinged by a hinge means 12 whereby the members may be folded together into face to face engagement when not in use, or unfolded into an aligned position for operation. The second member 11 is provided with a slot 13 adjacent its inner end portion arranged to be in alignment with a second slot 14 adjacent the inner end portion of the first member 10 such that when the members 10 and 11 are in unfolded or aligned position as shown in Figure 2, the slots 13 and 14 provide a single elongated channel passing under the hinge means 12. A cover plate 15 may be provided for covering a portion of the slot 13 on the second member 11.

As shown in both Figures 1 and 2, a sliding block 16 is fitted within the slot 13 under the cover plate 15. This block is dimensioned such that in a first position it fits wholly within the slot 13. Upon sliding movement of the block to a second position in the elongated channel defined by the slots 13 and 14, it fits partially within the slot 14 as well as the slot 13 as shown in Figure 2. The slide block 16 thus serves to lock the members 10 and 11 in unfolded position and hold them in rigid alignment. Preferably, a raised end portion 17 extending above the edges of the slot is provided on the block 16 to facilitate manual movement of the sliding block. Movement of the block into the slot 14 is thus checked by abutment of the raised portion 17 against the front edge of the cover plate 15 whereas its rearward movement within the slot 13 is checked by the far end of the slot 13. The first member 10 includes a recessed opening 18 positioned at a length from the hinge 12 such that it will receive the raised portion 17 of the slide block 16 when the members 10 and 11 are folded into face to face engagement, whereby the slide block 16 is prevented from movement while the members are folded and a flush face to face engagement is effected.

As best shown in Figures 2 and 3, the first member 10 is additionally provided with an elongated slot 19 adjacent its far end portion partially covered with a cover plate 20 and arranged to receive a T-shaped member having a leg portion 21 slidable within the slot 19. The cross arm 22 of the T member extends in a lateral direction and is provided with a projection 23 at one end. This lateral projection 23 is arranged to co-operate with a second lateral projection 24 at the far end of the member 11. The projections 23 and 24 extend the same lateral distance from the longitudinal edge of the members 10 and 11.

In the preferred embodiment of the device, each of the members 10 and 11 is provided on its back surface with a conventional fluid bubble level as at 25 and 26 transversely extending substantially midway of the ends of each member.

Figure 4:
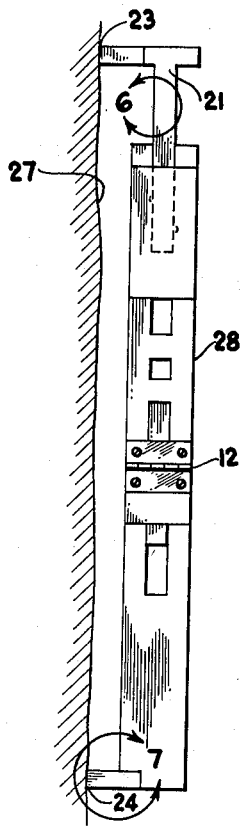
Figure 4 is an elevational view of the plumb indicating device illustrating the operation of plumbing a surface.
Figure 5:
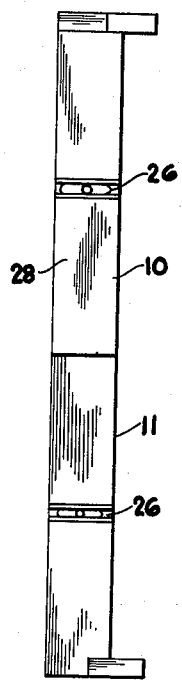
Figure 5 is a view of the backside of the device as illustrated in Figure 4.

Referring now to Figures 4 and 5, the operation of the device as described thus far will be evident. As shown in Figure 4, for example, assume it is desired to plumb an uneven wall surface 27. The lower member 11 and its projection 24 is positioned against the base of the wall and the T member then telescoped out of the slot 19 in the first member 10 to a position such that the lateral projection 23 will engage a point on the wall surface 27 which it is desired to plumb with respect to the lower point. The two lateral projections 23 and 24 are thus caused to engage the upper and lower points on the uneven wall surface 27 and the plumbing may be readily carried out by simply observing the levels 25 and 26 on the backside of the device as illustrated in Figure 5. Thus, when the fluid bubbles are centered in the levels 25 and 26, the upper point of engagement on the wall surface 27 by the projection 23 is in true vertical alignment with the lower point of engagement by the lateral projection 24. The provision of the lateral projections enables plumbing of the upper and lower portions of the wall surface notwithstanding the presence of uneven portions as indicated in Figure 4. However, for smooth surfaces, the opposite straight edge 28 may be employed. It will be evident that the measurements may be taken relatively quickly since the entire device, when locked in aligned unfolded position, is rigid.

Figure 6:
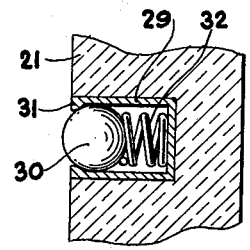
Figure 6 is an enlarged sectional view of a portion of the device shown closed in the circular arrow 6 of Figure 4.

In order to insure that the vertical distance between the lateral projections 23 and 24 remains constant during measurements, it is important that the telescoping T leg 21 within the slot 19 of the first member 10 remain in its set position. To this end, the edges of the T leg 21 are preferably provided with spring biased buttons adapted to frictionally engage the edges of the slot 19. Referring specifically to Figure 6 which illustrates an enlargement of one such button, the construction comprises a socket housing 29 imbedded in the edge of the T leg for housing a ball or button 30. The upper peripheral edges of the cylindrical socket 29 are peened over as at 31 to provide a peripheral flange preventing the ball 30 from dropping out of the socket. A small coil spring 32 provides an outward biasing force against the ball 30 whereby it frictionally engages the edges of the slot 19. Any other type of spring biasing or bow springs may be employed to insure a secure friction fit of the T leg member 21 within the slot 19.

Figure 7:
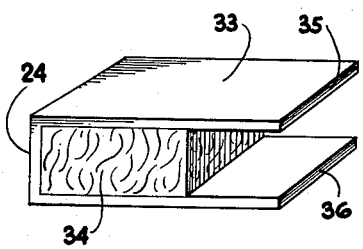
Figure 7 is an enlarged perspective view of the end projecting means enclosed within the circular arrow 7 of Figure 4; and, Figure 8 illustrates an additional extension member.

In certain instances in which it is desired to store the plumb indicating device of this invention in a tool box of limited dimensions, it may be desirable that the lateral projections 23 and 24 be removed in order that the width dimension of the box need be no greater than the width of the members 10 and 11. For this purpose, each of the projections 23 and 24 may be constructed as illustrated in Figure 7. In this construction, the projection 24, for example, includes a generally U-shaped metal bracket 33 housing a solid block 34 constituting the projecting portion of the member but dimensioned to fit within the U-bend portion of the bracket to leave a pair of flanges 35 and 36. These flanges 35 and 36 are spring biased together such that they will grip on the upper and lower edges of the end portion of the second member 11 in one instance, or the T arm portion of the T member in the other instance. When it is desired not to use the projections, the brackets 33 may simply be removed.

Figure 8:
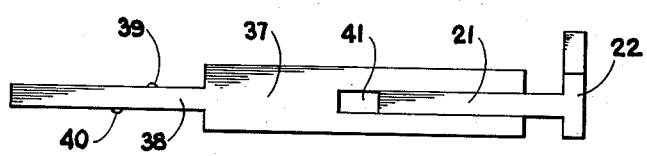

Figure 8 illustrates an extension member 37 which may be employed with the first member 10 for enabling an even greater distance between the engaging projections 23 and 24 to be plumbed. As shown in Figure 8, this extension member includes a narrowed tongue portion 38 dimensioned to fit within the slot 19 of the first member 10. This tongue portion may similarly include spring biased friction engaging means 39 and 40 to insure a friction fit of the tongue 38 within the slot 19. The upper portion of the extension 37 includes an elongated slot 41 dimensioned similarly to the slot 19 on the first member 10 for receiving the leg 21 of the T member as described previously. By use of the extension member, even greater distances may be plumbed and the entire device may thus accommodate differently spaced points for different types of construction.

In disasssembling the structure, the extension 37 is removed and the T member then re-inserted within the slot 19 and telescoped completely within the first member. The lateral projections 23 and 24 may then be simply removed, the slide block 16 retracted, and the first and second members folded together into face to face engagement. The extension member 37 may then be placed on top of the two members and together with the small projections 23 and 24 stored in a relatively compact carrying case.

Various modifications within the scope and spirit of the teachings of this invention will occur to those skilled in the art. The plumb indicating device is therefore not to be thought of as limited to the exact construction shown in the drawings for purposes of illustration.

What is claimed is:

1. A plumb indicating device comprising, in combination: first and second elongated members; hinge means connecting said members together in end to end relationship so that in an unfolded position said members are in alignment and in a folded position, said members are in face to face engagement; first and second lateral projecting means at the far ends of said first and second members, respectively, adapted to engage a plumb surface; leveling means transversely positioned on at least one of said members for indicating the plumb characteristics between the points of said surface engaged by said projecting means; slot means in the adjacent end portions in each of said members adapted to be aligned to define a single elongated channel passing under said hinge means when said members are in an unfolded position; a slide block fitted within said channel and dimensioned to fit wholly within the slot of the second member when in a first position and partially within the slot of each of said first and second members when in a second position, whereby said hinge means is locked in an unfolded position when said slide block is moved to said second position, said slide block including a raised end portion passing above the edges of the slot for manually moving said slide block, said first member including a recess dimensioned to receive said raised portion to lock said elongated members when said slide block is in said first position and said members are in a folded position.

2. A device according to claim 1, in which said first member includes an elongated slot at its far end portion; said first lateral projecting means including a support comprising a T-shaped block having a leg portion slidable in said elongated slot, whereby an extension means is provided for varying the distance between said first and second lateral projecting means; and, spring biasing means between said leg portion and said slot for frictionally retaining said T-shaped block extension means in any set position.

3. A device according to claim 2, and a further extension means comprising an extension member having a narrowed tongue portion at one end dimensioned to fit within said elongated slot and a second elongated slot in its other end adapted to receive said T-shaped block member leg portion.

References Cited in the file of this patent

UNITED STATES PATENTS

| | | |
|---|---|---|
| 686,360 | Smiddy et al. | Nov. 12, 1901 |
| 885,658 | Abrahams | Apr. 21, 1908 |
| 1,623,897 | Williams | Apr. 5, 1927 |